(12) United States Patent
Vetter et al.

(10) Patent No.: US 11,491,918 B2
(45) Date of Patent: Nov. 8, 2022

(54) SENSOR MODULE FOR A VEHICLE INCLUDING AT LEAST ONE SENSOR

(71) Applicant: VALEO SYSTEMES D'ESSUYAGE, La Verriere (FR)

(72) Inventors: Dominik Vetter, Bietigheim-Bissingen (DE); Markus Miller, Bietigheim-Bissingen (DE); Maxime Baudouin, La Verriere (FR); Jordan Vieille, La Verriere (FR)

(73) Assignee: Valeo Systemes d'Essuyage, LaVerriere (FR)

( * ) Notice: Subject to any disclaimer, the term of this patent is extended or adjusted under 35 U.S.C. 154(b) by 129 days.

(21) Appl. No.: 17/028,472

(22) Filed: Sep. 22, 2020

(65) Prior Publication Data

US 2021/0094474 A1 Apr. 1, 2021

(30) Foreign Application Priority Data

Sep. 30, 2019 (EP) ...................................... 19200411

(51) Int. Cl.
*B60R 1/08* (2006.01)
*B60R 1/06* (2006.01)
*B60R 1/12* (2006.01)

(52) U.S. Cl.
CPC .............. *B60R 1/08* (2013.01); *B60R 1/0602* (2013.01); *B60R 1/12* (2013.01); *B60R 2001/1223* (2013.01); *B60R 2001/1253* (2013.01)

(58) Field of Classification Search
CPC ........... B60R 1/08; B60R 1/0602; B60R 1/12; B60R 2001/1223; B60R 2001/1253;
(Continued)

(56) References Cited

U.S. PATENT DOCUMENTS

| 5,721,639 A | 2/1998 | Aoshima et al. |
| 2001/0012814 A1* | 8/2001 | May .......................... B04B 9/06 494/24 |

(Continued)

FOREIGN PATENT DOCUMENTS

| WO | WO-0232593 A1 * | 4/2002 | ............... B08B 3/02 |
| WO | 2015161097 A1 | 10/2015 | |

(Continued)

OTHER PUBLICATIONS

European Patent Office, Extended European Search Report for corresponding European Application No. 19200411.7-1132, dated Mar. 26, 2020.

*Primary Examiner* — William R Alexander
*Assistant Examiner* — Rahman Abdur
(74) *Attorney, Agent, or Firm* — Valeo Systemes d'Essuyage (57) ABSTRACT

The invention relates to a sensor module for a vehicle, the sensor module comprising at least one housing which houses at least one first detection device that is adapted to collect information about the vehicle's environment; the housing comprising one base adapted to be fixed to the vehicle, at least one cover joined to the base and at least one optical face joined to both the cover and the base; characterized in that the first detection device comprises at least one sensor, a casing which receives the sensor and an electric motor adapted to rotate the casing at sufficiently high-speeds.

15 Claims, 7 Drawing Sheets

(58) Field of Classification Search
CPC ......... B60S 1/528; B60S 1/56; H04N 5/2252; H04N 5/22521; H04N 5/2171; G02B 27/0006; G03B 17/08; G01D 11/245; G01D 11/26; B08B 3/02; B08B 3/10
USPC ........................................................ 359/838
See application file for complete search history.

(56) References Cited

U.S. PATENT DOCUMENTS

| | | | |
|---|---|---|---|
| 2012/0075519 A1* | 3/2012 | Blasch | H04N 5/2254 348/340 |
| 2017/0036647 A1* | 2/2017 | Zhao | B05B 1/04 |
| 2017/0080863 A1 | 3/2017 | Henion et al. | |
| 2018/0272958 A1* | 9/2018 | Brouwer | G01S 7/027 |
| 2018/0335622 A1* | 11/2018 | Trebouet | H04N 5/2252 |
| 2019/0041234 A1* | 2/2019 | Ghannam | G01D 11/245 |
| 2019/0061622 A1 | 2/2019 | Hoyda et al. | |
| 2019/0162953 A1 | 5/2019 | Bretagnol et al. | |
| 2020/0017035 A1 | 1/2020 | Bretagnol et al. | |

FOREIGN PATENT DOCUMENTS

| | | | | |
|---|---|---|---|---|
| WO | 2018019662 A1 | 2/2018 | | |
| WO | 2018091635 A1 | 5/2018 | | |
| WO | 2018146058 A1 | 8/2018 | | |
| WO | 2018149591 A1 | 8/2018 | | |
| WO | WO-2018149591 A1 * | 8/2018 | ............. | B05B 15/50 |
| WO | WO-2019219132 A1 * | 11/2019 | | |

\* cited by examiner

SENSOR MODULE FOR A VEHICLE INCLUDING AT LEAST ONE SENSOR

CROSS-REFERENCE TO RELATED APPLICATIONS

This application claims priority benefit to European patent application No. 19200411.7 filed Sep. 30, 2019, the disclosure of which is hereby incorporated by reference in its entirety.

TECHNICAL FIELD

The present invention concerns the automotive field of driving assistance systems implemented on multiple vehicles. In particular, the present invention relates to driving assistance system implementation on sensor modules.

BACKGROUND

More and more nowadays, vehicles are implemented with driving assistance systems. Such driving assistance systems comprise a multitude of sensors—for instance, optical sensors, electromagnetic sensors or ultrasonic sensors, which are adapted to collect information about the vehicle's environment; computing programs that are adapted to treat the collected information and other computing programs adapted to take decisions and make the vehicle react appropriately in response depending on the treatment results of said information.

In order to optimize efficiencies, related sensors have to be implemented on car bodies and to be perfectly clean at all times. Indeed because dirty sensors may collect incorrect information that could lead to bad or adverse decision-making after the treatment of false information by associated computing programs. As a result, automotive suppliers are continuously working on implementation improvements of related sensors on automotive car bodies and the cleaning of such sensors.

It is understood that, in order to collect sufficient information about a vehicle's environment, sensors must be implemented all around the car and that each of them needs to have a dedicated means for cleaning.

The present invention at least partially solves this problem by providing a sensor module for a vehicle, the sensor module comprising at least one housing which houses at least one first detection device and is adapted to collect information about the environment of the vehicle, the housing comprising one base adapted to be fixed to the vehicle, the housing also comprising at least one cover joined to the base and at least one optical face joined to both the cover and the base, wherein the first detection device comprises at least one sensor, a casing which receives the sensor, said casing comprising at least one transparent face arranged in front of the sensor, and an electric motor adapted to rotate the casing at high speed.

According to the invention, high-speed corresponds to a sufficiently rated speed to clean, at least partially, the casing of the first detection device in part to or benefitted from the centrifugal force generated by such rotation. For instance, such high-speed is a speed of 10,000 revolutions per minute. The sensor of the first detection device can (for instance) be chosen among optical sensors such as cameras, CCD image sensor (Charged Coupled Device), CMOS image sensor (Complementary Metal-Oxide Semiconductor), infrared sensor such as infrared cameras, optoelectronic sensor such as a LED (Light-Emitting Diode), electromagnetic sensors such as a RADAR (Radio, Detection And Ranging) or a LIDAR (Light Detection And Ranging), or ultrasonic sensors. Obviously, those are just examples of the kind or type of sensor that may be used in the first detection device, and any other kind of sensor that may be used without departing from the scope of the invention.

SUMMARY

According to one aspect of the invention, the casing and the transparent face are centered on the optical axis of the sensor.

According to another aspect of the invention, the electric motor is adapted to rotate the casing around a rotational axis. In other words, the casing and the transparent face are mounted rotatably around a rotation axis corresponding to the rotation axis of the electric motor.

The electric motor is arranged opposite the transparent face of the casing with respect to the rotation axis. Thus, the casing and the transparent face are mounted coaxially in rotation and are placed in rotation simultaneously by the electric motor, which ensures their rotation around the rotation axis.

More particularly, the rotation axis of the casing is coincident with the one optical axis of the sensor.

According to an aspect of the invention, the sensor module comprises, at least, a front face formed by the optical face, an internal lateral face intended to face the vehicle and an external lateral face turned away from the internal lateral face, at least one first hole being arranged in the external lateral face, and such first hole being adapted to receive, at least partially, a detection surface of the first detection device. More precisely, when the sensor module if fixed to the vehicle, the front face of the sensor module is turned toward a rear part of the vehicle. Additionally, the sensor module comprises a rear face which is turned toward a front part of the vehicle, a top face which faces the sky and a bottom face which faces the ground. Optionally, one aperture may be arranged in the bottom face of the sensor module, this aperture being adapted to accommodate another detection device, for instance means to project light adapted to help the driver to find his car on a car park.

According to another aspect of the invention, at least one second hole is arranged in the housing, such a second hole being adapted to receive, at least partially, a spraying device configured to spray washing fluid on the transparent face of the casing. According to this aspect of the invention, it is understood that the centrifugal force generated by the high-speed rotation of the casing contributes to the cleaning by unsticking dirt or soiling and by drying the washing fluid sprayed on the transparent face.

According to the invention, the spraying device is telescopic and can take a first resting position wherein all the spraying device is located inside the housing of the sensor module and a second working position wherein at least part of the spraying device extends through the second hole arranged on this housing. In other words, generally, the spraying device is protected by the sensor module housing and it is pulled out only when the casing of the detection device needs to be cleaned.

According to the invention the sensor module includes a bracket adapted to support, at least, the first detection device. At least one cut-out is arranged in the bracket and at least the first detection device is adapted to be fixed on an edge of the bracket which defines such cut-out. Advantageously, the first detection device extends, at least partially, through such a cut-out. In other words, it is understood that said cut-out faces the first hole arranged on the housing. More advantageously, such cut-out faces the first hole and the second hole arranged on the housing and the first detection device and the spraying device both extend, at least partially, through the cut-out. Alternately, two cut-outs could be formed in the bracket, the first detection device then extending through a first cut-out and the spraying device then extending through a second cut-out. Anyway, forming only one single cut-out adapted to receive both the first detection device and the spraying device reduces the tolerance stack-up, thus helping to control the relative positions of the first detection device and of the spraying device. Advantageously, the bracket can also be adapted to support the spraying device.

According to the invention, the bracket comprises at least one first fixation means, the housing comprises at least one fixation element, the at least one first fixation means being adapted to cooperate with the at least one fixation element in order to fix the bracket on the housing. Advantageously, the at least one fixation element is arranged on the base of the housing. The words "adapted to cooperate" here mean that a first fixation tool, such as a screw, is received in both the first fixation means and the fixation element in order to fix the bracket on the housing, and especially on the base of this housing on which is arranged the at least on fixation element. In other words, it is understood that the bracket is fixed only on the base of the housing of the sensor module. According to an embodiment of the invention, the bracket can comprise up to three first fixation means adapted to cooperate with as much fixation elements arranged on the base of the housing.

According to the invention, the bracket comprises at least one second fixation means, the first detection device comprises at least one flange and the at least one second fixation means is adapted to cooperate with the at least one flange in order to fix the first detection device on the bracket. For instance, the at least one flange emerges from the electric motor of the first detection device and more particularly from the stator of the electric motor. As mentioned earlier, the first detection device is adapted to be fixed on an edge of the bracket which defines the cut-out. As a result, it is understood that the at least one second fixation means is arranged on such edge of the bracket. The words "adapted to cooperate" here mean that a second fixation tool, such a s a screw, is received in both the second fixation means and an opening arranged in the concerned flange in order to fix the first detection device on the bracket.

Advantageously, at least one shock absorbing device is layered between the at least one flange of the first detection device and the second fixation tool received in the at least one second fixation means of the bracket and in the opening arranged in the concerned flange.

For instance, the shock absorbing device can be made of rubber. According to the invention, such shock absorbing means is adapted to absorb, at least partially, the vibrations generated by the high-speed rotation of the casing of the first detection device, thus preventing any damage that could be caused by these vibrations. According to one embodiment of the invention, three flanges emerge from the first detection device and three second fixation means are arranged on the bracket. According to this embodiment, one shock absorbing device can advantageously be layered between each flange and each second fixation tools.

According to the invention, the bracket can comprise at least one third fixation means, the spraying device can comprise at least one fixation plate, the at least one third fixation means and the at least one fixation plate being adapted to cooperate with each other in order to fix the spraying device on the bracket. The spraying device comprises at least one main body extending along a longitudinal direction, the spraying device being adapted to move along the longitudinal direction and the at least one fixation plate extends from the main body, transversally to such main body. For instance, the main body and the fixation plate can form a single piece, that is to say that the main body and the fixation plate cannot be separated without damaging, at least, one of them. At least one opening is arranged in this fixation plate, such opening being adapted to cooperate with the at least one third fixation means of the bracket. In other words, a third fixation tool, such as a screw, is received in both the opening of the fixation plate and the at least one third fixation means of the bracket.

Optionally, the sensor module can include at least one second detection device adapted to collect information about the environment of the vehicle, the bracket comprising at least one wall facing the optical face of the sensor module, this wall comprising at least one fixation device adapted to fix the second detection device. According to an aspect of the invention, the optical face can be a display screen adapted to display information collected by, at least, the first and/or the second detection devices. For instance, the second detection device can be an electromagnetic sensor such as a RADAR or a LIDAR, an optical sensor such as a camera or an infrared camera, a light sensor such as a LED, or an ultrasonic sensor. Of course, the second detection device can be of any other kind without departing from the scope of the invention. Alternately, the optical face can be a mirror. According to this alternative, the sensor module lacks the second detection device, and the bracket lacks the wall which comprises the fixation device.

According to the invention, the optical face is fixed to the base and to the cover of the sensor module by a snap connection. Advantageously, the cover and the base are also joined to each other thanks to snap connection.

The invention also comprises a vehicle comprising a sensor module according to the invention.

BRIEF DESCRIPTION OF THE DRAWINGS

Other features, details and advantages of the invention can be inferred from the specification of the given hereunder invention. Various embodiments are represented in the figures wherein.

DETAILED DESCRIPTION

Figure 1:
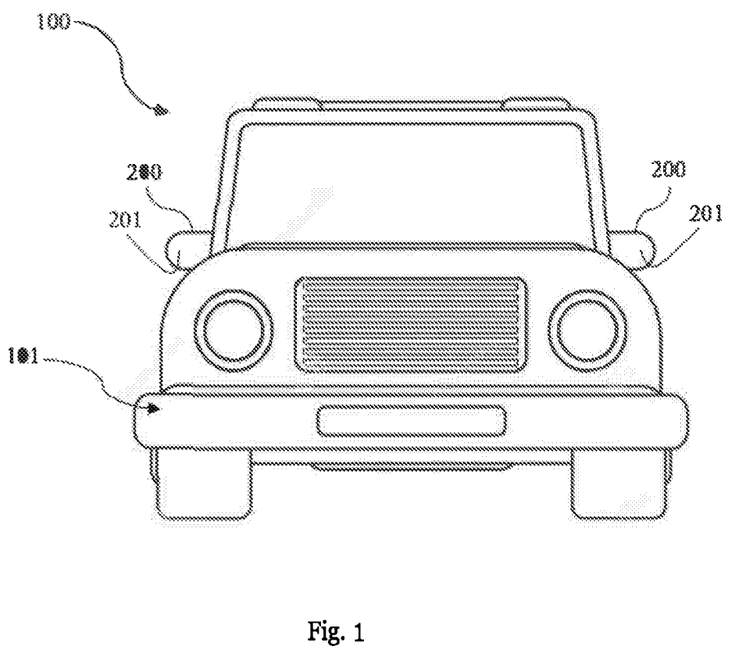
FIG. 1 is a schematic representation of a vehicle including at least one sensor module according to the invention.

FIG. 1 shows a vehicle 100 according to the present invention which comprises two sensor modules 200. Each sensor module 200 is located on one side of the vehicle 100 and this figure makes visible only a rear face 201 of each sensor modules 200, said rear face corresponding to a face turned toward a front part 101 of the vehicle 100. Each of these sensor modules 200 comprises at least one detection device adapted to collect information concerning an environment of the vehicle 100.

Figure 2:
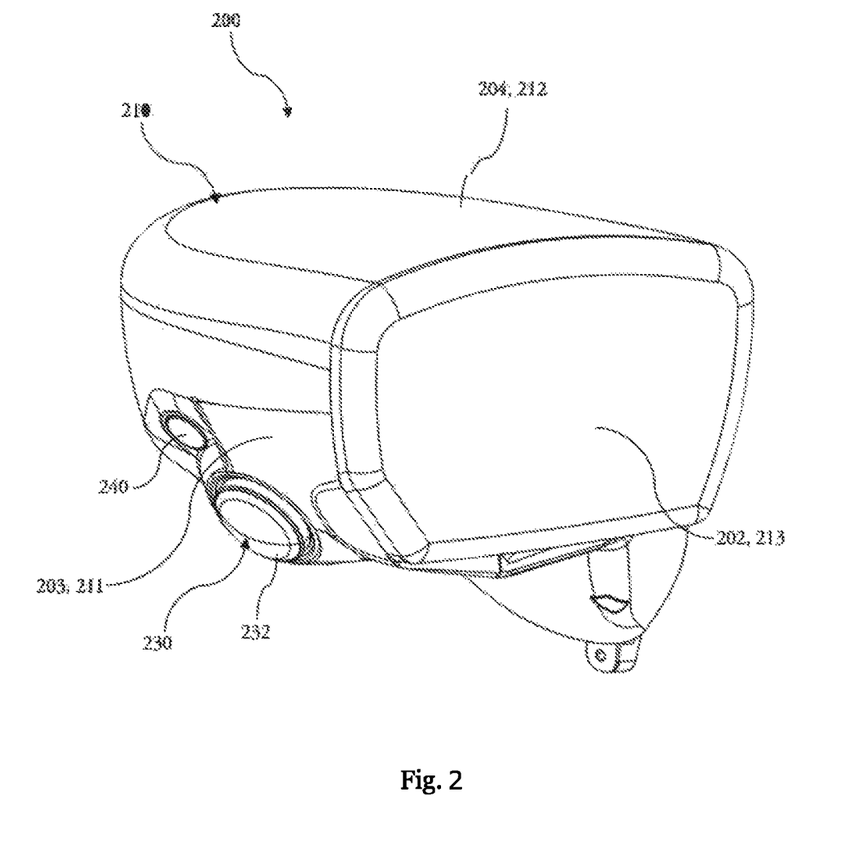
FIG. 2 is a perspective view of the sensor module according to an embodiment of the invention.

FIG. 2 shows one sensor module 200 according to an embodiment of the invention. This FIG. 2 more particularly shows a front face 202 opposite to the rear face visible in FIG. 1 an external lateral face 203 and a top face 204 of this sensor module 200, the front face 202 being turned toward a rear part of the vehicle when the sensor module 200 is fixed to said vehicle, the external lateral face 203 being turned away from the vehicle and the top face 204 facing the sky.

Sensor module 200 according to the invention comprises at least one housing 210 formed by a base 211, a cover 212 and an optical face 213. As later described, the base 211, the cover 212 and the optical face 213 of the housing 210 are joined two by two thanks to snap connections. As shown, the base 211 of the housing 210 forms, at least, the external lateral face 203 of the sensor module 200 whereas the cover 212 forms the top face 204 of the sensor module 200 and the optical face 213 forms the front face 202 of it. According to the invention, the sensor module 200 is fixed to the vehicle by its base 211. The base 211 also forms a bottom face of the sensor module 200, this bottom face facing the ground when the sensor module 200 is fixed to the vehicle.

At least a first detection device 230 is accommodated in the housing 210 of the sensor module 200. As such, only a part of this first detection device 230 is visible on FIG. 2. Especially, this first detection device 230 extends through a first hole—visible on FIG. 3—arranged in the external lateral face 203 of the sensor module 200.

First detection device 230 comprises at least one sensor encapsulated in a self-cleaning casing made to be rotated around a rotation axis at high speed. The rotation axis is coincident with the optical axis of the sensor. The at least one sensor can, for instance, be chosen among an electromagnetic sensor such as a RADAR or a LIDAR, an optical sensor such as a camera or an infrared camera, an ultrasonic sensor or a light sensor such as a LED. Of course, those are just examples of the kind of sensor that can be used, and any other king of sensor can be considered without departing from the scope of the invention.

To ensure perfect cleaning at any moment of the vehicle life, sensor module 200 additionally includes at least one spraying device 240 which comprises a nozzle adapted to spray washing fluid on the first detection device 230 according to the invention. This spraying device 240 is a telescopic device configured to take at least one first resting position—shown on FIG. 2—wherein the spraying device is located inside the housing 210 and a second working position (not shown on the figures) wherein the spraying device extends through a second hole in order to free its nozzle and allow the spraying of washing fluid on the first detection device 230.

In particular, the casing of the first detection device 230 may comprise at least one transparent face 232 arranged in front of the detection device's sensor and the spraying device is adapted to spray washing fluid on this transparent face 232. In other words, when spraying device 240 is in its second working position, the spraying device nozzle faces (at least partially) the transparent face of the casing. Said transparent face may be cleaned by centrifugal force when the casing is rotated around the rotation axis corresponding to the motor's rotational axis, at high-speeds and cleaned from the benefits of projected washing fluid, the rotation axis being coincident with the optical axis of the sensor According to an illustrated embodiment of the invention, sensor module 200 is equipped with at least one second detection device (for instance visible on FIG. 7) adapted to collect information concerning the vehicle's environment. According to this embodiment, optical face 213 is a display screen adapted to display information collected by detection devices carried by the vehicle. For instance, the display screen can be adapted to display information collected by the first and/or the second detection devices as carried by sensor module 200. It is understood that collected information is treated by a computer integrated to the vehicle before being displayed on the display screen.

According to another embodiment of the invention (not illustrated but described here), the optical face is a mirror. According to this other embodiment of the invention, the sensor module then lacks the second detection device.

Figure 3:
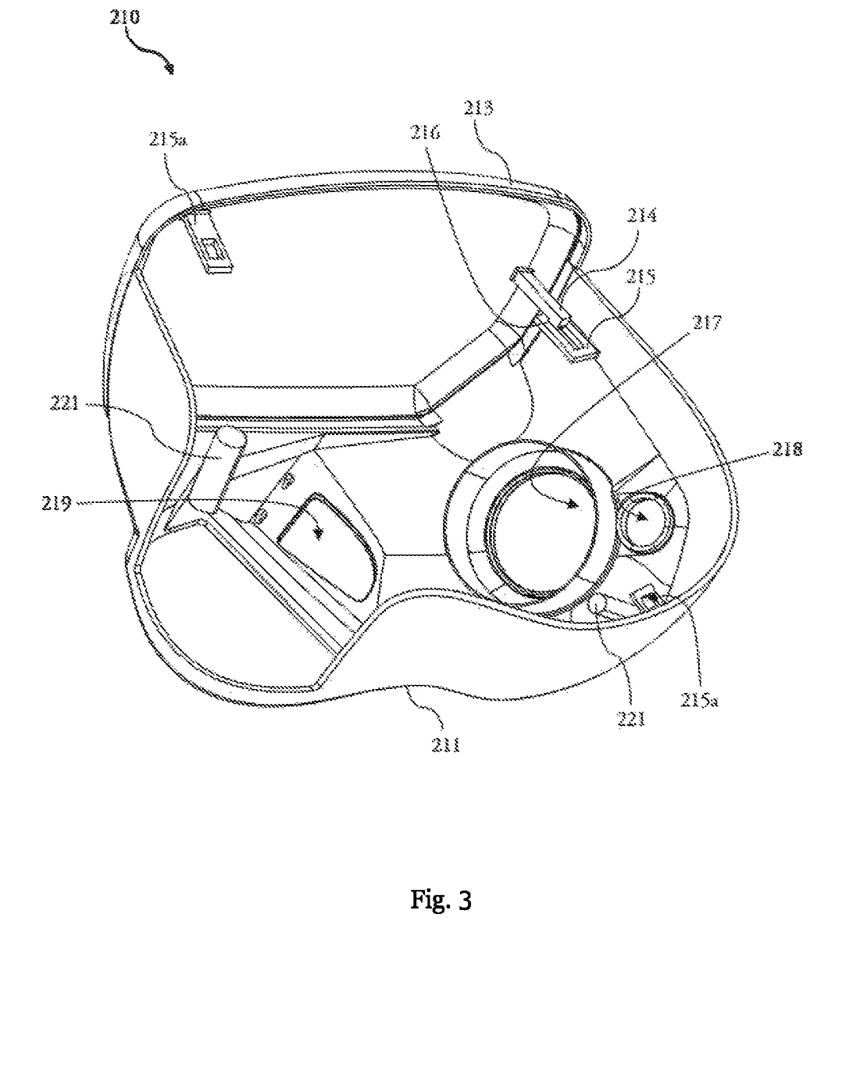
FIG. 3 is a perspective view of a housing of the sensor module according to the embodiment shown on FIG. 2, this housing being represented without its cover.

FIG. 3 shows housing 210 without its cover. As shown, optical face 213 is joined to base 211 from the benefit of a snap connection. In other words by example, optical face 213 comprises at least one locking tab 214 and base 211 comprises as much notch(es) 215, each locking tab 214 comprising one tooth 216 adapted to be received in one of the notches 215. As illustrated, each tooth 216 presents at least one face adapted to abut one face of a corresponding notch 215, thus locking optical face 213 onto the base 211. According to the embodiment illustrated on FIG. 3, sensor module 200 comprises two of these snap connections despite only one of them being illustrated.

Additionally, three other notches 215a are distributed on optical face 213 and on base 211 (only two being visible on FIG. 3) in order to fix the cover between the base and the optical face. The cover comprises three other tongues, each equipped with one other tooth adapted to cooperate with the other notches 215a in a similar way to what was previously described. Of course, more or less tongues and notches could be provided and they could be distributed differently from what is shown on FIG. 3 without departing from the present scope or spirit of the invention. In a similar way, snap connections could be realized by any other known suitable connection means within the scope of the invention.

FIG. 3 also shows first hole 217 adapted to receive, at least partially, the first detection device and the second hole 218 through which the spraying device extends when switching from its first resting position to its second working position. As mentioned above, first hole 217 and second hole 218 are arranged in base 211 of the housing 210, and especially in the external lateral face of the sensor module formed by base 211. With the spraying device being adapted to spray washing fluid on the casing of the first detection device, it is understood that first hole 217 and second hole 218 are arranged next to each other.

Aperture 219 is also arranged in base 211, and more specifically in a part of this base 211 which forms the bottom face of the housing 210. As an example, this aperture 219 can be intended to receive a third detection device, such as a light arranged to help users of the vehicle to find a user's vehicle more easily—for instance, on a parking lot. It is understood that this aperture 219 is optional and that housing 210 of sensor module 200 could lack this aperture 219 without departing from the scope of the invention.

Finally, it must be noted that base 211 of housing 210 is equipped with three fixation elements 221 (only two being visible on FIG. 3) which are configured to permit the fixation of a bracket on base 211 of housing 210. In other words, those fixation elements 221 are adapted to receive at least one first fixation tool, such as a screw, as explained hereunder, which is also adapted to be received in a corresponding orifice arranged in the bracket. As also described hereunder, the bracket is adapted to support at least the first detection device. Advantageously, the bracket may also be adapted to support the spraying device.

Figure 4:
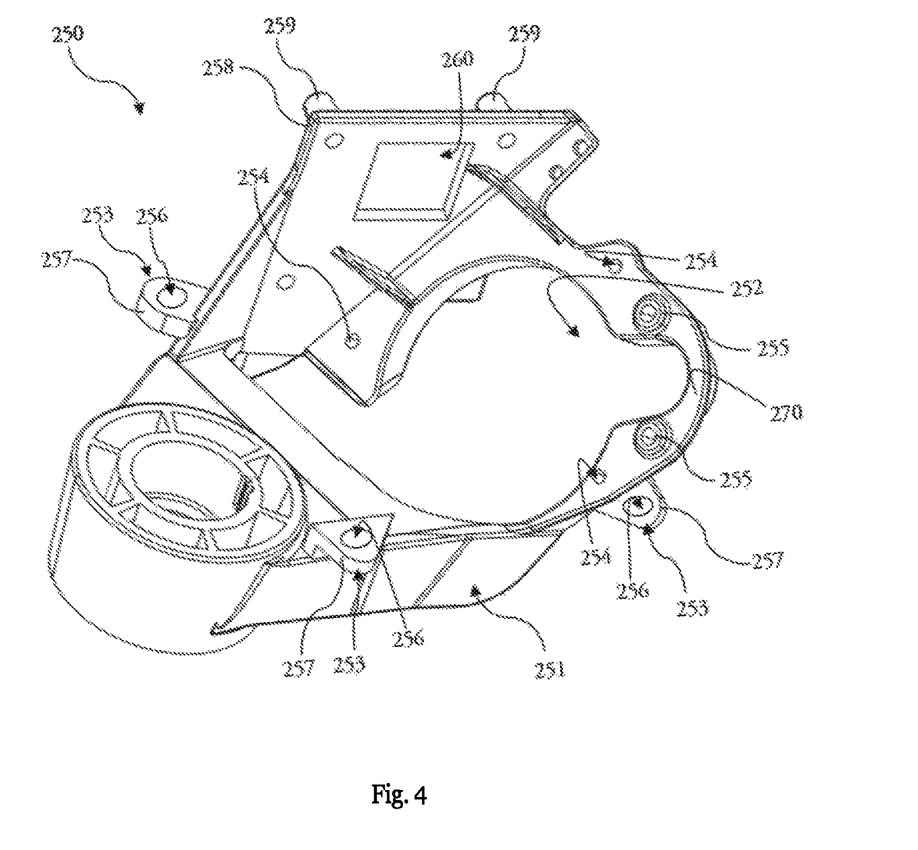
FIG. 4 is a perspective view of a bracket intended to be housed in the housing of the sensor module according to the embodiment of the invention illustrated on FIG. 2.

FIG. 4 shows bracket 250 configured to support at least the first detection device and adapted to be fixed on the base of the housing. According to the illustrated embodiment, bracket 250 is adapted to support the first detection device and the spraying device. This bracket 250 presents a main body 251 in which at least one cut-out 252 is realized. This cut-out 252 is intended to face, at least, the first hole and the second hole arranged in the base of the housing. In other words, it is understood that this cut-out 252 is intended to receive, at least partially, the first detection device and the spraying device. Advantageously, cut-out 252 also extends to face the aperture arranged in the housing. It is thus understood that the first detection device and the spraying device are both in contact with the bracket in an area surrounding said cut-out 252. Moreover, the third detection device if any may be in contact with that surrounding cut out 252.

According to another example of the invention not shown here, three separated cut-outs could be realized in bracket 250: a first cut-out being adapted to receive the first detection device, a second cut-out being adapted to receive the spraying device and a third cut-out 252 being adapted to receive the third detection device as previously described. Advantageously, making only one single cut-out reduces the tolerance stack-up and therefore helps to control the final position of each of the first detection device, the spraying device and the third detection device.

Bracket 250 also comprises at least one first fixation means 253 configured to cooperate with the fixation element arranged on the base of the housing in order to fix the bracket 250 on the housing, at least one second fixation means 254 configured to cooperate with part of the casing of the first detection device in order to fix this first detection device on the bracket 250 and at least one third fixation means 255 configured to cooperate with a fixation plate carried by the spraying device in order to fix the spraying device on the bracket 250.

According to the embodiment illustrated here, bracket 250 comprises three first fixation means 253, three second fixation means 254 and two third fixation means 255. Of course, bracket 250 could comprise more or less of each fixation means without departing from the scope of the present invention. The first fixation means 253 are adapted to cooperate with one of the fixation elements arranged on the base of the housing. That is to say that the first fixation tool is adapted to be received in the fixation element as described above and is also adapted to be received in one of the first fixation means 253. This cooperation results in the fixation of bracket 250 on the housing—more precisely, on the base of this housing. As illustrated, first fixation means 253 takes the form of an orifice 256, which receives the first fixation tool, such orifice 256 being arranged in a tongue 257 which extends laterally from the main body 251 of the bracket 250. Second fixation means 254 and third fixation means 255 will be later described, but it is noted that the second fixation means 254 are arranged on an edge 270 of the bracket 250 which defines the cut-out 252. According to the illustrated embodiment, third fixation means 255 is also arranged on such edge 270.

According to the illustrated embodiment, wall 258 extends from main body 251 of bracket 250. This wall 258 extends perpendicularly to the main body 251 of the bracket 250 and it presents at least one fixation device 259 adapted for the fixation of the second detection device mentioned above. According to the illustrated embodiment, wall 258 presents at least three fixation devices 259, advantageously four of them. Those fixation devices 259 obviously permit the fixation of the second detection device on bracket 250, but they are also advantageously used as positioning means. As earlier mentioned, the first detection device and the second detection device are both adapted to collect information about the environment of the vehicle, such information being treated by a computing program which takes decisions based on such information. As such, the positioning of those first and second detection devices is important as wrong positions can lead to miscalculations which can have serious consequences, especially by leading the associated computing program to make decisions based on false information.

This wall 258 also presents a hollowness 260 a feature benefit to which some air can flow and thus participate to maintain the second detection device at an optimal temperature, that is to say avoiding an overheating which could damage it.

According to the other embodiment wherein the optical face of the sensor module is a mirror, the sensor module does not comprise the second detection device and the bracket then does not comprise such a perpendicular wall.

As explained below, bracket 250 is intended to maintain relative positions of the casing which houses the sensor of the first detection device and the spraying device. Thus, such bracket 250 must keep its shape. According to the invention such bracket 250 is thereby made of a rigid material which can be metal or synthetic material. For instance, bracket 250 is made of aluminum.

Figure 5:
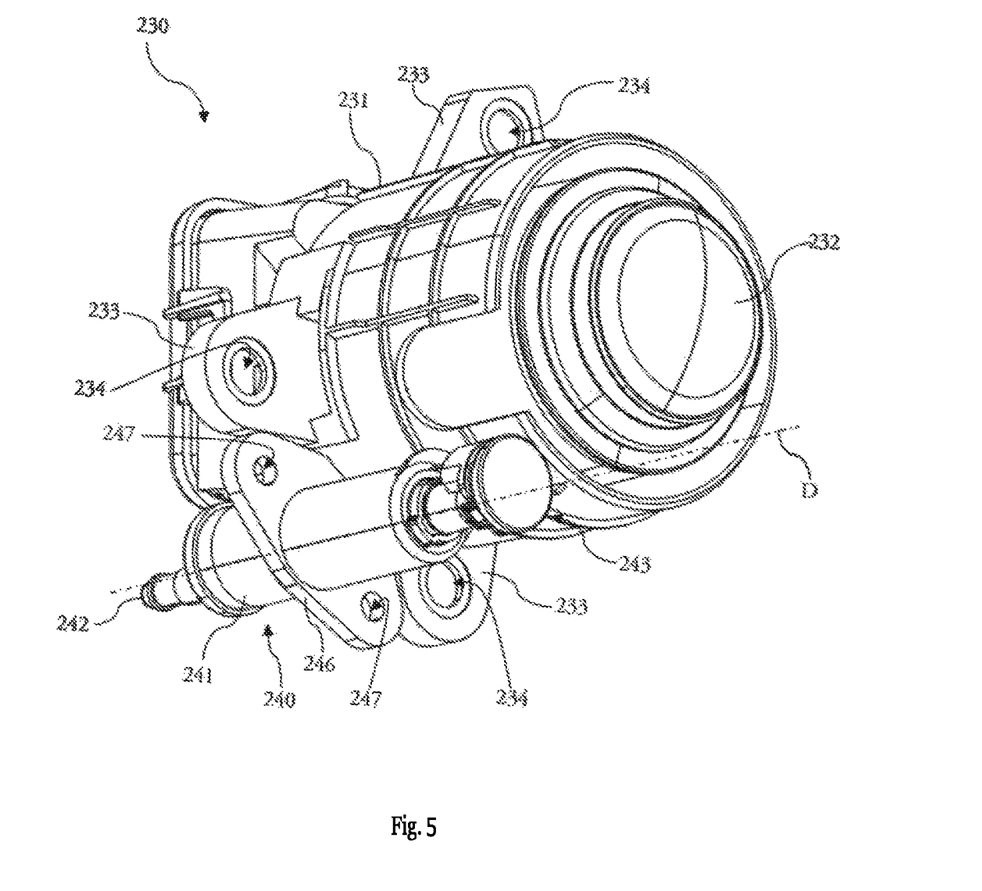
FIG. 5 is a perspective view of a detection device and a spraying device both housed in the housing of the sensor module of the invention.

FIG. 5 shows, in a perspective view, the first detection device 230 and the spraying device 240. The first detection device 230 comprises a casing 231 which houses at least one sensor, for instance an optical sensor such as a camera, an electromagnetic sensor or an ultrasonic sensor, and an electric motor. As mentioned above, the casing 231 comprises at least one transparent face 232 which faces the sensor. The casing 231 and the transparent face 232 are centred on the optical axis of the sensor. The electric motor is configured to rotate the casing 231 around a rotation axis at high-speed in order to clean it. The rotation axis corresponds to the rotation axis of the motor and is coincident with the optical axis of the sensor. In other words, the electric motor is arranged opposite the transparent face of the casing with respect to the rotation axis. The casing and the transparent face are mounted coaxially in rotation and are placed in rotation simultaneously by the electric motor, which ensures their rotation around the rotation axis. Especially, the electric motor is adapted to rotate the casing 231 around the rotation axis at a speed around 10 000 revolutions per minute, thus generating a centrifugal force that permits to detach the dirt accumulated on the transparent face 232, therefore cleaning the transparent face when said face is dirty and does not permit an appropriate collection of information about environment of the vehicle. The first detection device 230 also comprises at least one flange 233, according to the illustrated embodiment three flanges 233, adapted to cooperate with the second fixation means arranged on the housing. Each of these flanges 233 presents an opening 234 adapted to receive a second fixation tool such as a screw for instance. It is understood that this second fixation tool is also received in the second fixation means arranged on the bracket, thus fixing the first detection device 230 on the bracket 250.

As explained above, the sensor module according to the invention additionally comprises the spraying device 240 adapted to spray washing fluid on the transparent face 232 of the casing 231 to help its cleaning. Advantageously, the centrifugal force generated by the high-speed rotation of the casing 231 also contributes to dry the washing fluid sprayed on the transparent face 232 by the spraying device 240. FIG. 5 shows the first resting position of this spraying device 240 when all of it is housed in the housing of the sensor module.

Spraying device 240 comprises, at least, a main part 241 extending along a longitudinal direction D and a fixation plate 246 arranged transversally to this main part 241. Especially, according to the embodiment illustrated on FIG. 5, the fixation plate 246 extends perpendicularly to the main part 241 of the spraying device 240. Two openings 247 are arranged through this fixation plate 246, each of these opening 247 being adapted to cooperate with the third fixation means arranged on the bracket.

Figure 6:
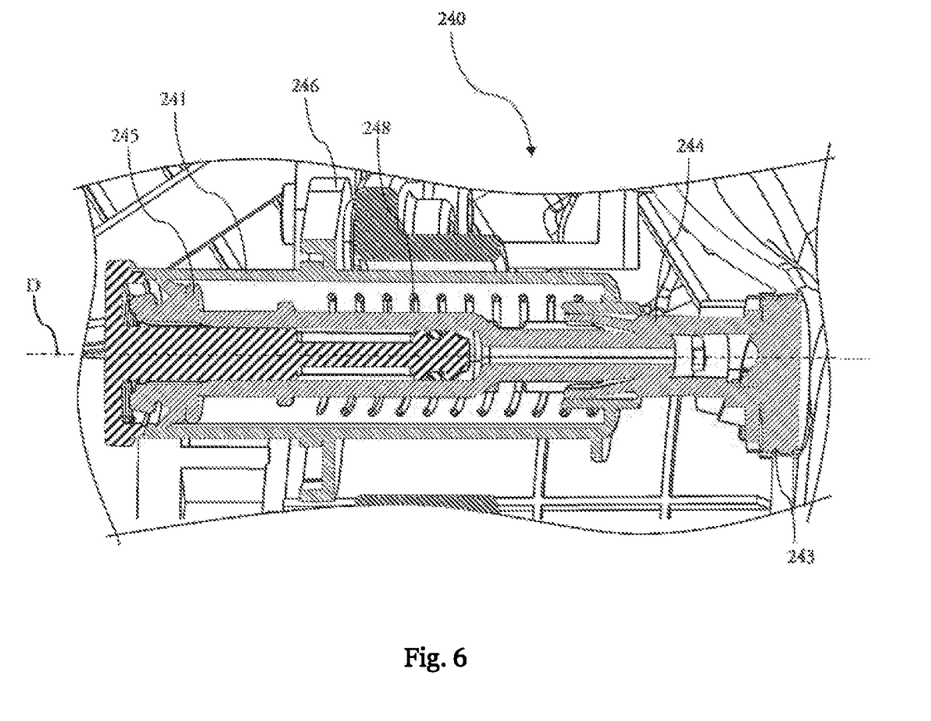
FIG. 6 is a cross-section view of the spraying device housed in the housing of the sensor module.

FIG. 6 is a cross-section view of the spraying device 240. As shown, this spraying device 240 comprises the main part 241 which extends along the longitudinal direction D, between a washing fluid inlet 242—visible on FIG. 5—through which the washing fluid enters the spraying device 240 and a nozzle 243 through which the washing fluid exits the spraying device 240 by being sprayed on the transparent face of the casing of the first detection device. According to the invention, the nozzle 243 is carried by a piston 244 which is received in the main part 241 of the spraying device 240 and which is adapted to move along the longitudinal direction D between the first resting position and the second working position of the spraying device 240. According to a first example of the invention, the piston 244 is moved from the first resting position to the second working position thanks to the washing fluid. This washing fluid enters in the spraying device 240 through the inlet 242 and generates a force which is applied on such piston 242, and more precisely, on a ring 245 which extends from such piston 244. Advantageously, this ring 245 and the piston 244 can form a single piece, that is to say that the piston 244 and the ring 245 cannot be separated from one another without damaging at least one of them. When there is enough washing fluid inside the spraying device 240, the piston 242 is deployed through the cut-out arranged in the bracket and through the second hole arranged in the housing, the spraying device 240 thus being in its second working position in which it can spray washing fluid on the casing of the first detection device. Advantageously, the washing fluid which makes the piston move along the longitudinal direction D is the same washing fluid which is sprayed on the casing of the detection device. The spraying device 240 also includes a spring 248 which is compressed by the piston 244 when the spraying device 240 is in its second working position. Once the washing fluid is sprayed on the casing of detection device, this spring 248 is decompressed, thus permitting the spraying device 240 to return to its first resting position. According to the invention, the second working position of the spraying device 240 is determined to permit to spray washing fluid on the transparent face of the casing which houses the sensor of the first detection device. Advantageously, the fixation of both the first detection device and the spraying device 240 on the bracket ensures that the actual second working position of the spraying device 240 actually matches its theoretical second working position and, as a result, that the washing fluid is actually sprayed on the transparent face of the casing.

According to another example of the invention, the piston can be moved along the longitudinal direction D thanks to an electric motor.

Figure 7:
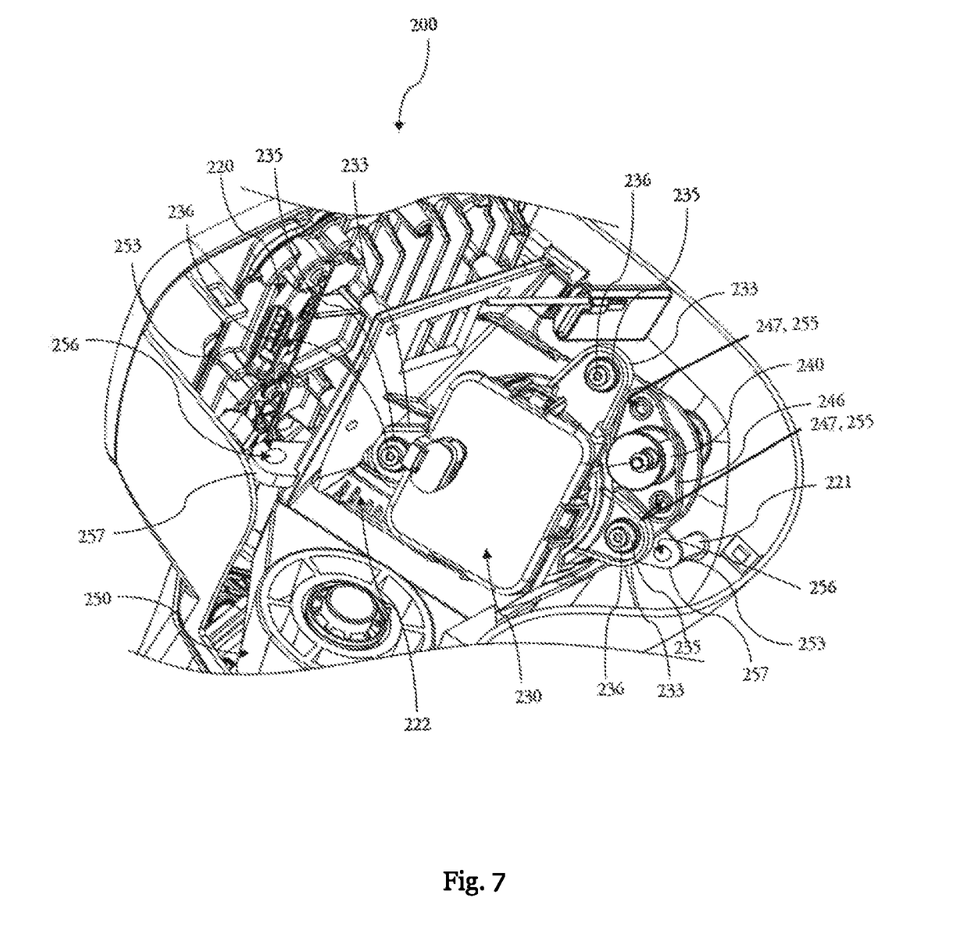
FIG. 7 is a perspective view of a part of the sensor module represented without the cover of its housing.

FIG. 7 is a perspective view of a part of the sensor module 200 represented without its cover. This figure particularly makes visible the fixation of the first detection device 230 and of the spraying device 240 on the bracket 250. This FIG. 7 also makes visible the second detection device 220 earlier described.

Especially, this FIG. 7 makes visible three shock absorbing devices 235 arranged on each flange 233 of the first detection device 230. According to the invention, those shock absorbing devices 235 are adapted to absorb shocks generated by the rotation of the casing 231 previously described. According to the example shown, those shock absorbing devices 235 are made of rubber and layered between the concerned flange 233 and the second fixation tool 236 adapted to be received in the opening realized in the flange 233 and in the second fixation means realized on the bracket 250. In other words, these shock absorbing devices 235 help preventing the damages that could be caused by the high-speed rotation of the casing of the first detection device 230.

FIG. 7 also partially shows the third detection device 222 received in the aperture of the housing and especially the connections of such third detection device 222. According to the example shown, this third detection device 222 is a light but it is understood that this is only an example and that this light could be replaced by another kind of detection device for instance. Alternately, the third detection device could also be replaced by any other electrical device without departing from the scope of the invention.

FIG. 7 also partially makes visible the cooperation between the first fixation means 253 of the bracket 250 and the fixation element 221 of the housing 210 and the cooperation between the third fixation means 255 and the fixation plate 246 of the spraying device 240.

As shown, each orifice 256 arranged in each tongue 257 of the bracket 250 is aligned with one of the fixation element 221 arranged on the base of the housing in order to allow the insertion in both the fixation element 221 and the orifice 256, of the first fixation tool, even if this first fixation tool is not illustrated on FIG. 7.

In a similar way, even if the third fixation tool is not illustrated on FIG. 7, it may be noted that the openings 247 arranged in the fixation plate 246 carried by the spraying device 240 are aligned with the third fixation means 255 arranged on the bracket 250, these openings 247 of the fixation plate 246 and the third fixation means 255 of the bracket 250 both being adapted to receive, each, one third fixation tool.

According to the invention, the assembly process of the sensor module according to the invention comprises, in this order, a first step during which the first detection device and the spraying device are fixed on the bracket, a second step during which the bracket is fixed on the housing of the sensor module, and more precisely on the base of such housing, and a third step during which the optical face, the base and the cover forming the housing of the sensor module are all fixed together. In other words, the first detection device and the spraying device are fixed to the bracket, thus forming a first assembly which is then fixed on the housing of the sensor module, and more precisely on the base of such housing. The housing can finally be closed thanks to the optical face and the cover which are both joined to the base in addition to be fixed to one another.

It will be understood from the foregoing that the present invention provides a simple, easily adaptable and easily replaceable means to accommodate a detection device and a spraying device adapted to spray washing fluid on the detection device in a sensor module.

However, the invention cannot be limited to the means and configurations described and illustrated herein, and it also extends to any equivalent means or configurations and to any technically operative combination of such means. In particular, the shape and arrangement of the bracket, the fixation means, the fixation devices and the fixation elements can be modified insofar as they fulfil the functionalities described in the present document.

What is claimed is:

1. A sensor module of a vehicle, the sensor module comprising at least one housing which houses at least one first detection device that is adapted to collect information about an environment of the vehicle,
   the housing including a base adapted to be fixed to the vehicle, the housing also including at least one cover joined to the base and at least one optical face joined to both said cover and the base,
   characterized in that the first detection device includes at least one sensor,
   a casing which receives said sensor, said casing including at least one transparent face arranged in front of said sensor,
   said transparent face configured to be cleaned through a means of centrifugal force when the casing is rotated around an axis corresponding to a rotational axis of an electric motor, and
   the electric motor adapted to rotate the casing at a speed that is sufficiently rated to clean about the casing.

2. The sensor module according to claim 1, comprising a front face formed by said optical face, an internal lateral face configured to face the vehicle and an external lateral face turned away from the internal lateral face,
   wherein a number of first holes is arranged in the external lateral face, said first hole being adapted to receive the first detection device by at least a portion.

3. The sensor module according to claim 2, wherein the optical face is fixed to said base and a cover of the sensor module by a snap connection.

4. The sensor module according to claim 1, wherein a number of second holes is arranged in the housing, said second hole being adapted to receive at least a portion of a spraying device that is configured to spray washing fluid on said transparent face of the casing.

5. The sensor module according to claim 4, wherein the spraying device is telescopic, the spraying device adapted to take a first resting position wherein all the spraying device is located completely inside the housing of the sensor module and a second working position wherein a portion of the spraying device extends through said second hole arranged in the housing.

6. The sensor module according to claim 1, including a bracket adapted to support the first detection device.

7. The sensor module according to claim 6, wherein a number of cut-outs is arranged in the bracket, and wherein said first detection device is adapted to be fixed on an edge of the bracket which defines said cut-outs.

8. The sensor module according to claim 7, wherein the bracket includes at least one first fixation means,
   wherein the housing includes at least one fixation element and wherein said first fixation means is adapted to cooperate with said fixation element in order to affix the bracket on the housing.

9. The sensor module according to claim 6, wherein the bracket includes at least one second fixation means, wherein the first detection device includes at least one flange and wherein the said second fixation means is adapted to cooperate with the at least one flange in order to affix the first detection device on the bracket.

10. The sensor module according to claim 9, wherein at least one shock absorbing device is layered between said flange of the first detection device and at least one second fixation tool received in said second fixation means of the bracket and in an opening arranged in an associated flange.

11. The sensor module according to claim 6, wherein the bracket includes at least one third fixation means, wherein the spraying device includes at least one fixation plate, and wherein said third fixation means and said fixation plate are adapted to cooperate with each other in order to fixate the spraying device on the bracket.

12. The sensor module according to claim 11, wherein the spraying device includes at least one main body extending along a longitudinal direction (D), the spraying device being adapted to move along the longitudinal direction (D) and wherein said fixation plate extends from said main body in a transverse arrangement to said main body.

13. The sensor module according to claim 6, including at least one second detection device adapted to collect information about the environment of the vehicle, the bracket including at least one wall facing the optical face of the sensor module, said wall including at least one fixation device adapted to fixate the second detection device.

14. The sensor module according to claim 1, wherein the cover is fixed to the base by a snap connection.

15. A vehicle comprising a sensor module according to claim 1.

* * * * *